June 7, 1932. W. H. CAMPBELL 1,862,210
APPARATUS FOR MAKING INNER TUBES
Filed Jan. 14, 1928 11 Sheets-Sheet 5
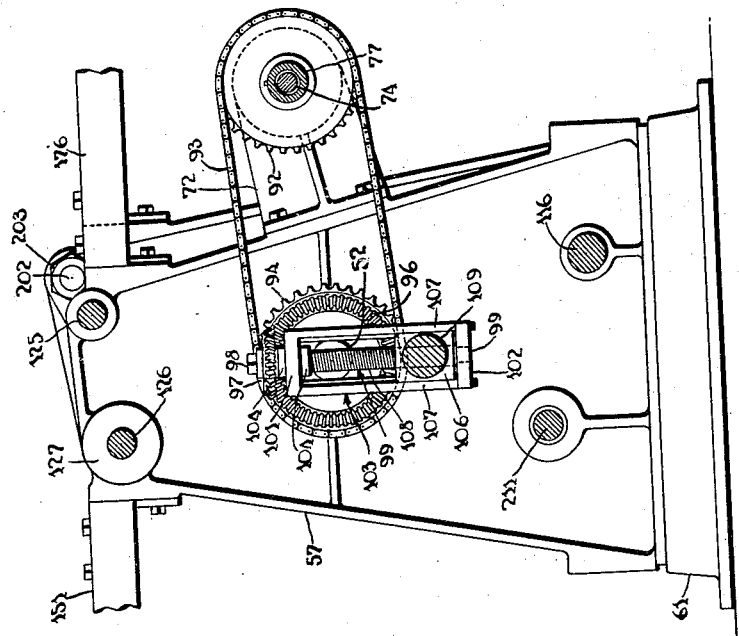
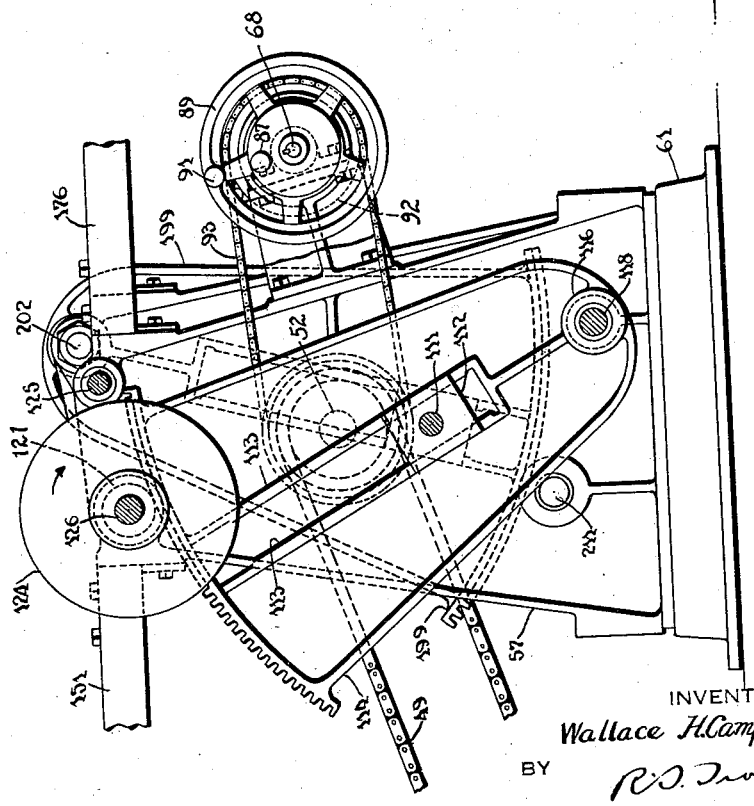
INVENTOR
Wallace H.Campbell.
BY
ATTORNEY June 7, 1932. W. H. CAMPBELL 1,862,210
APPARATUS FOR MAKING INNER TUBES
Filed Jan. 14, 1928 11 Sheets-Sheet 6
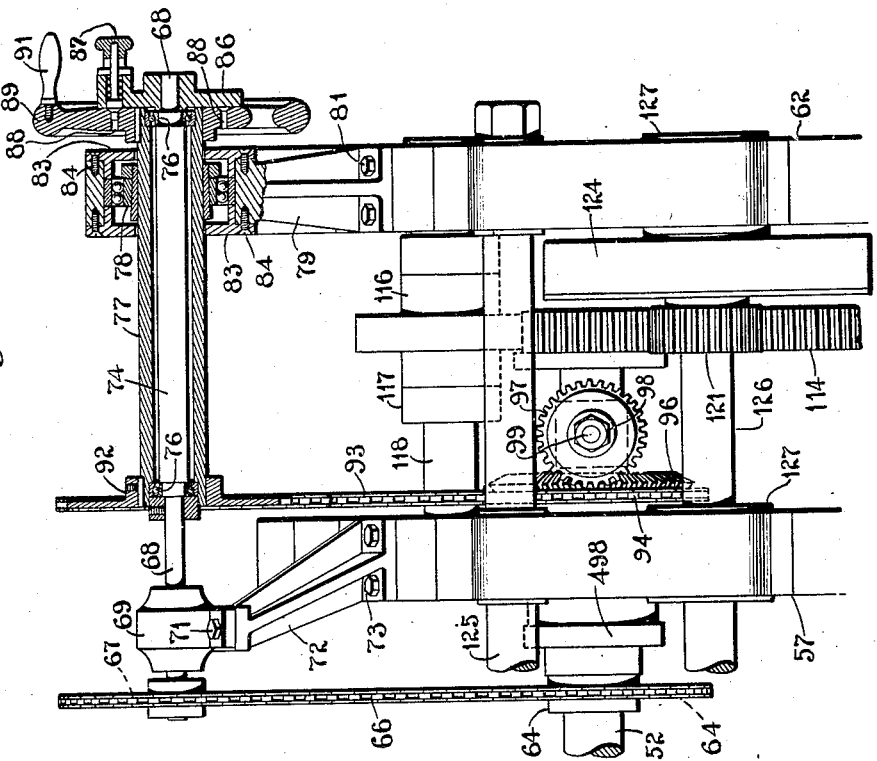
INVENTOR
Wallace H. Campbell.
BY
R.S. Ivogner
ATTORNEY

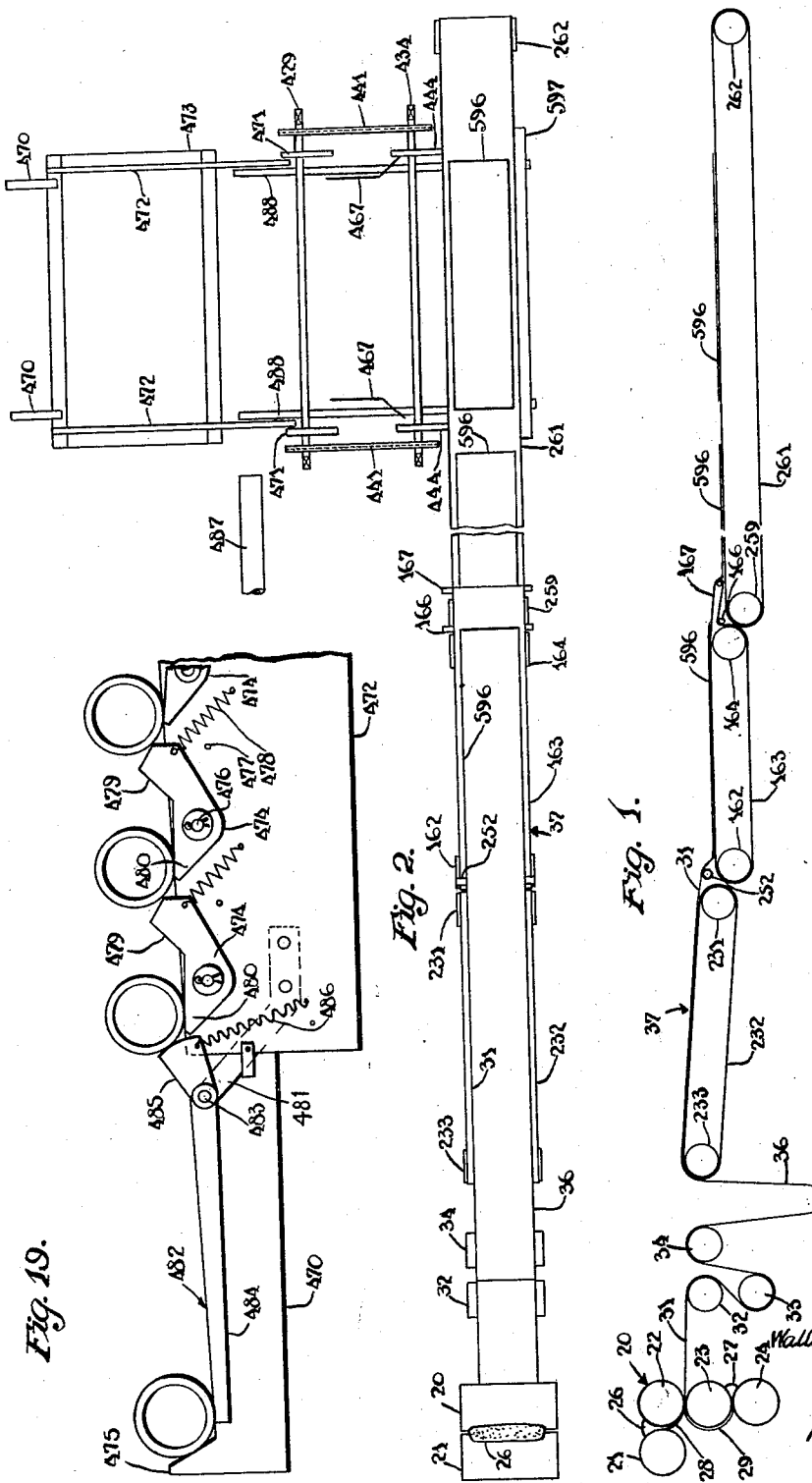

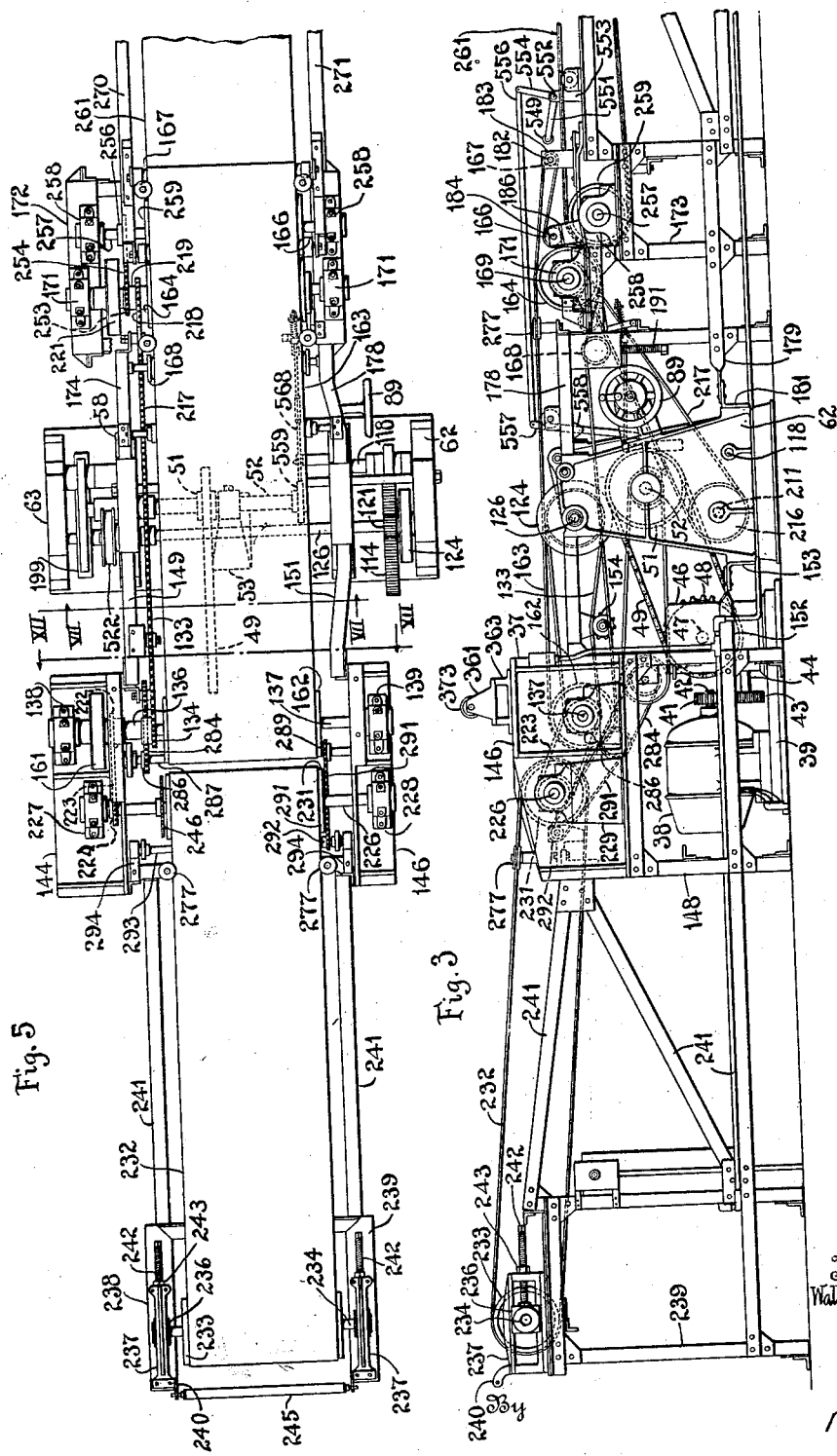

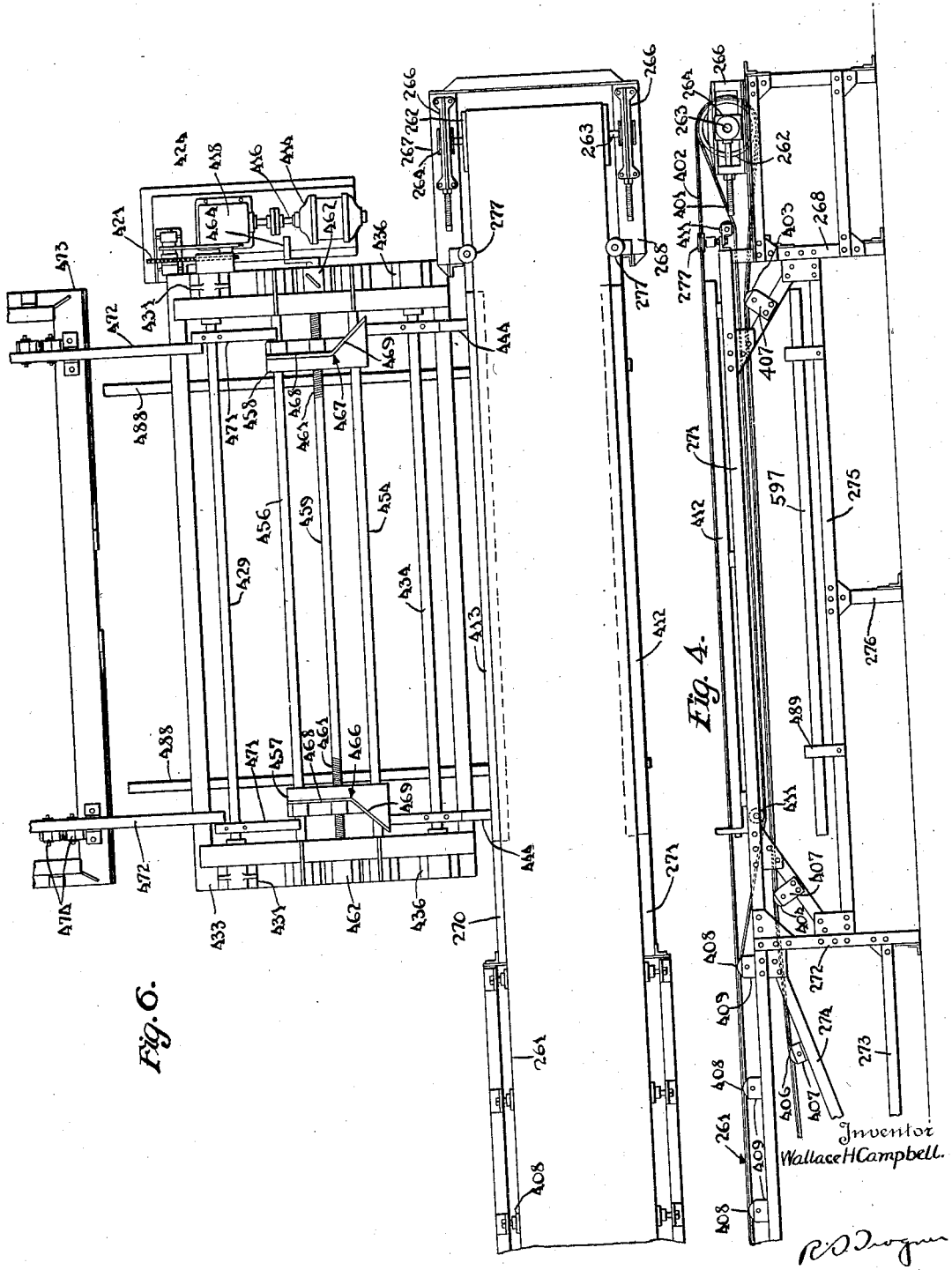

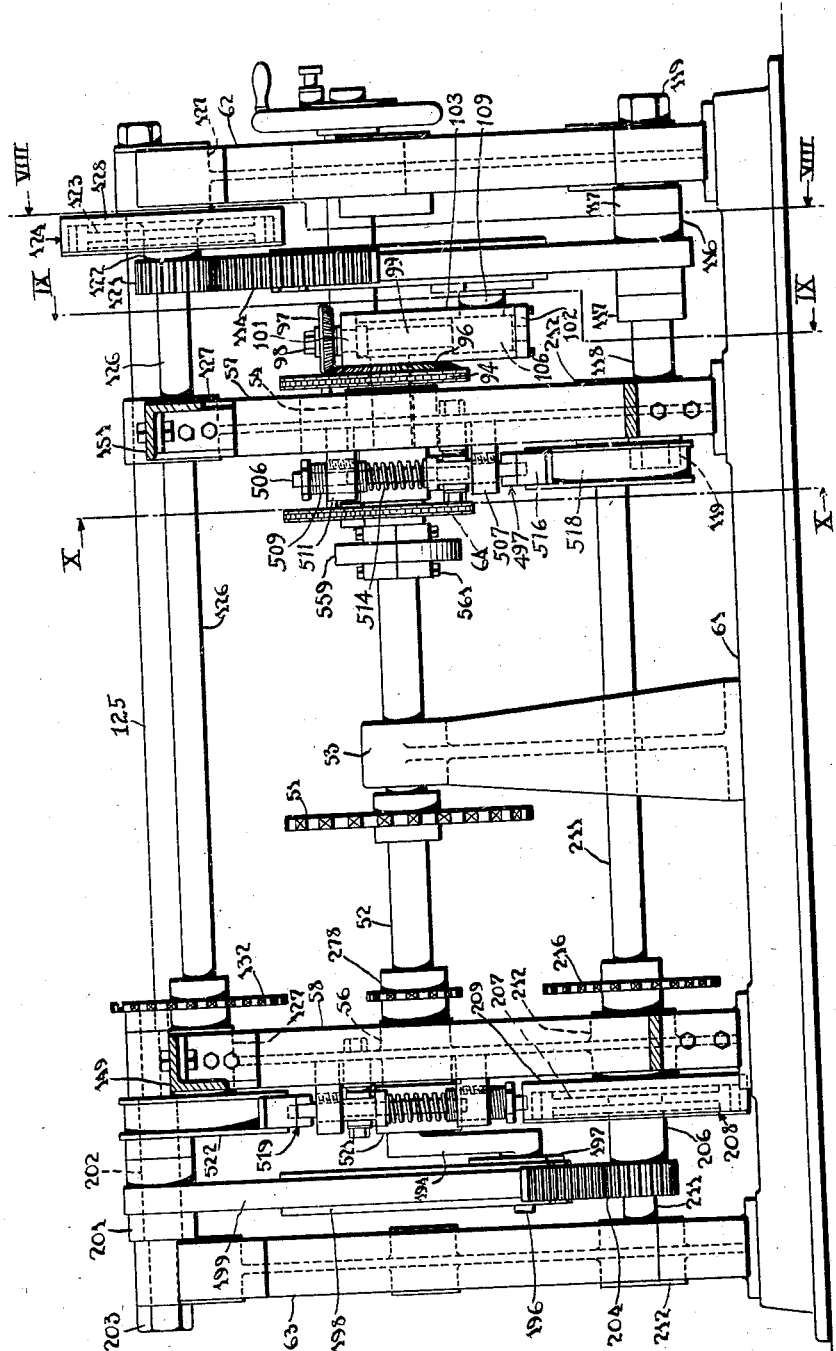

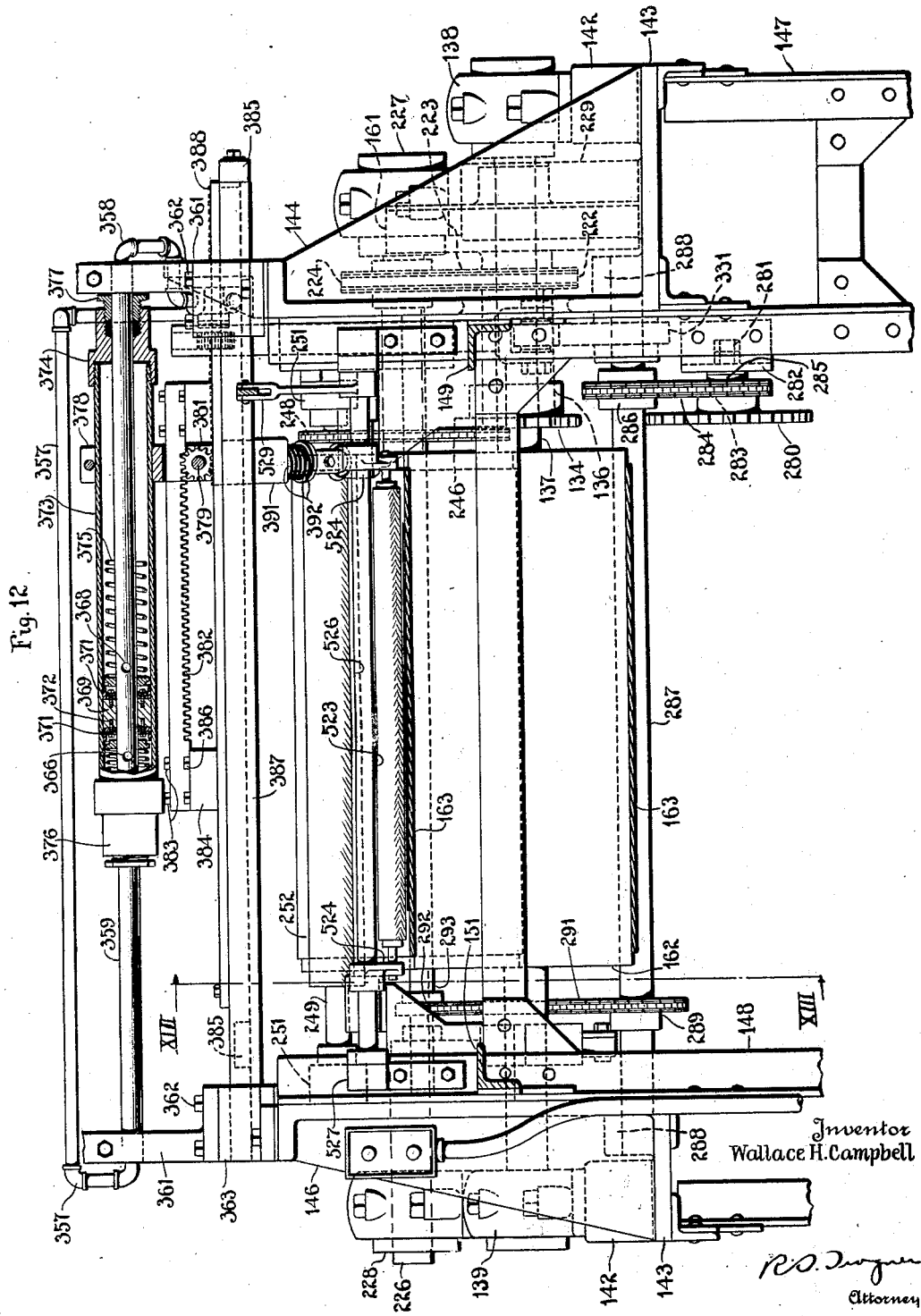

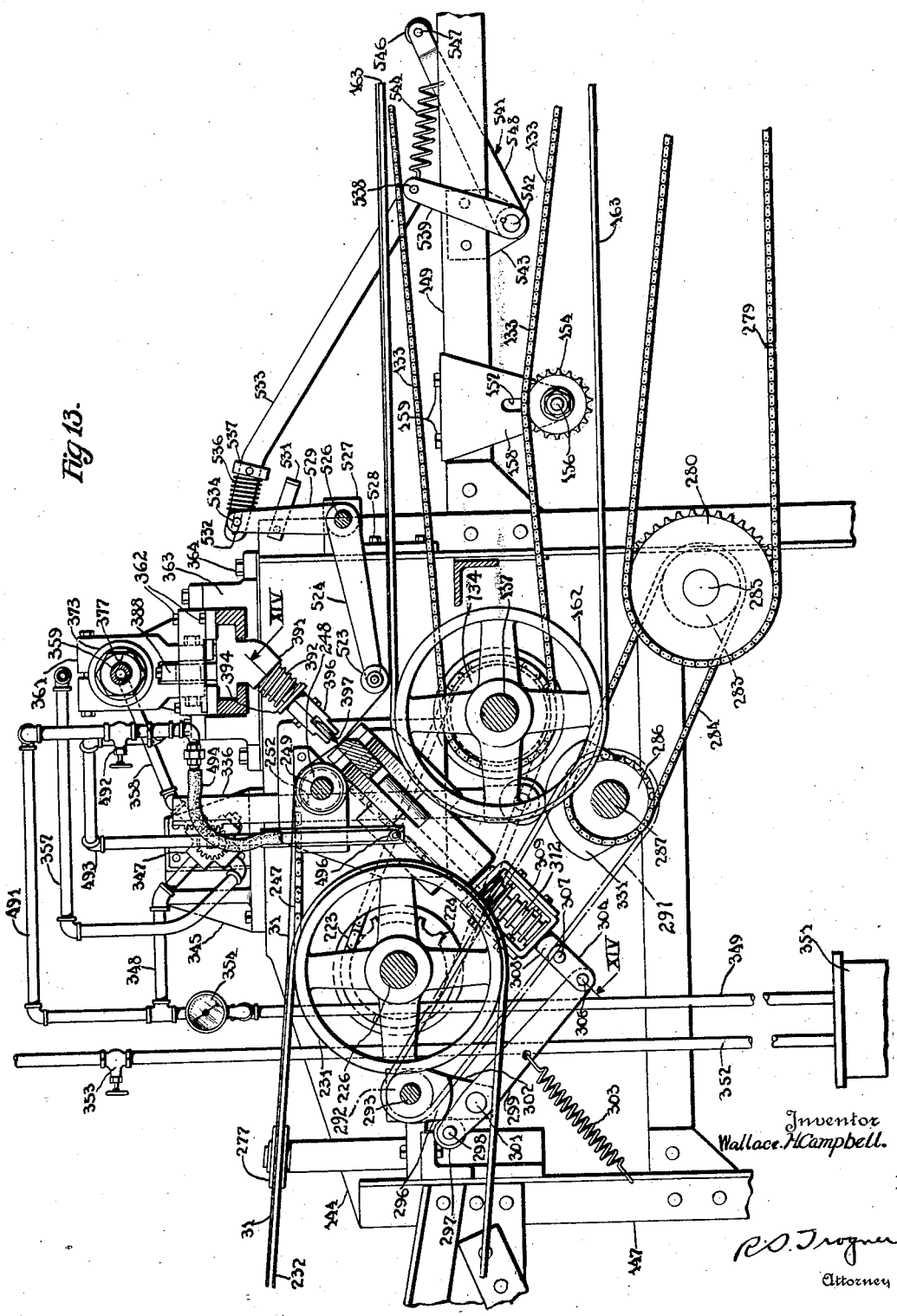

June 7, 1932. W. H. CAMPBELL 1,862,210
APPARATUS FOR MAKING INNER TUBES
Filed Jan. 14, 1928 11 Sheets-Sheet 9
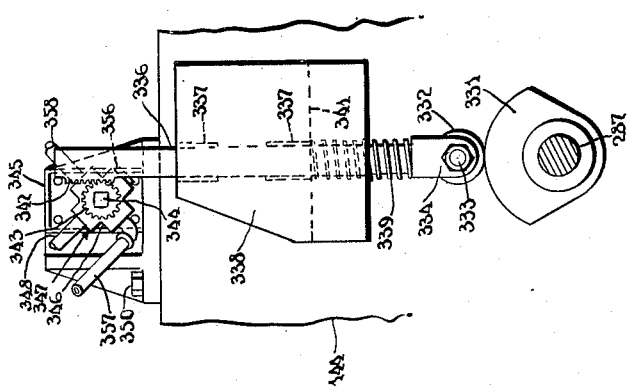
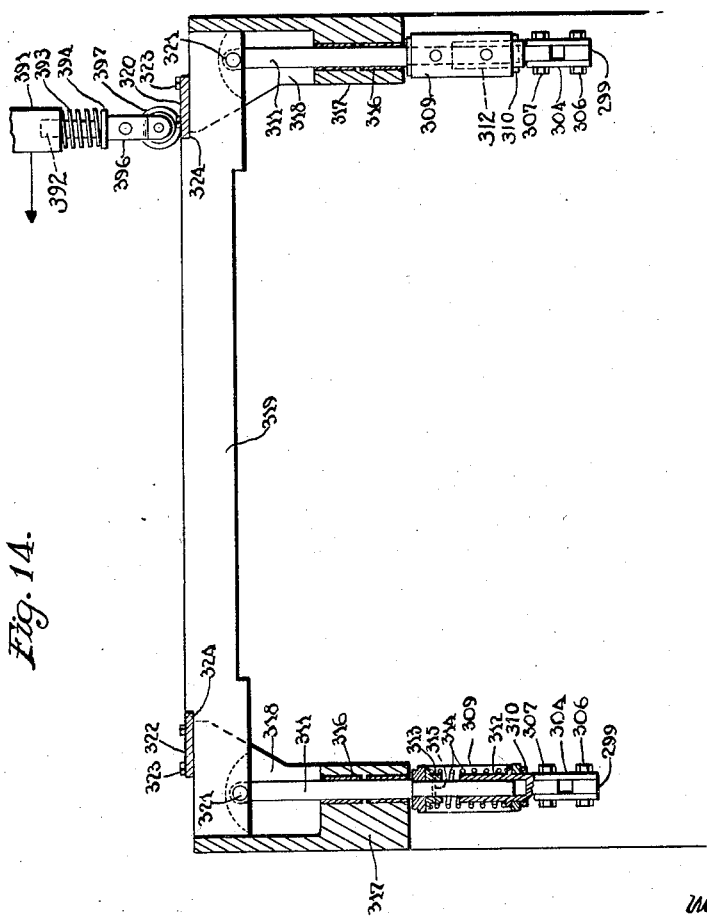
Inventor
Wallace H. Campbell.
By
Attorney

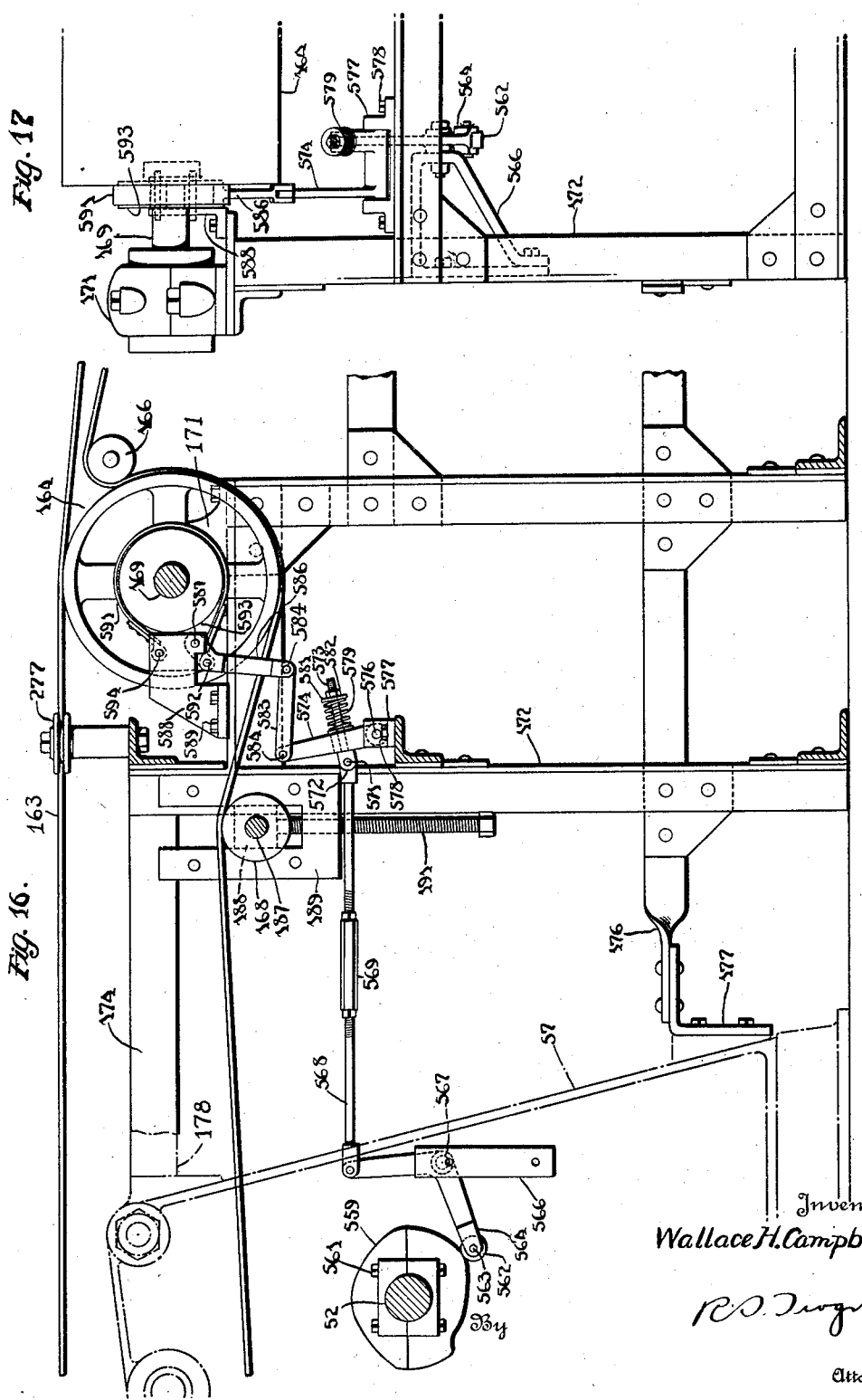

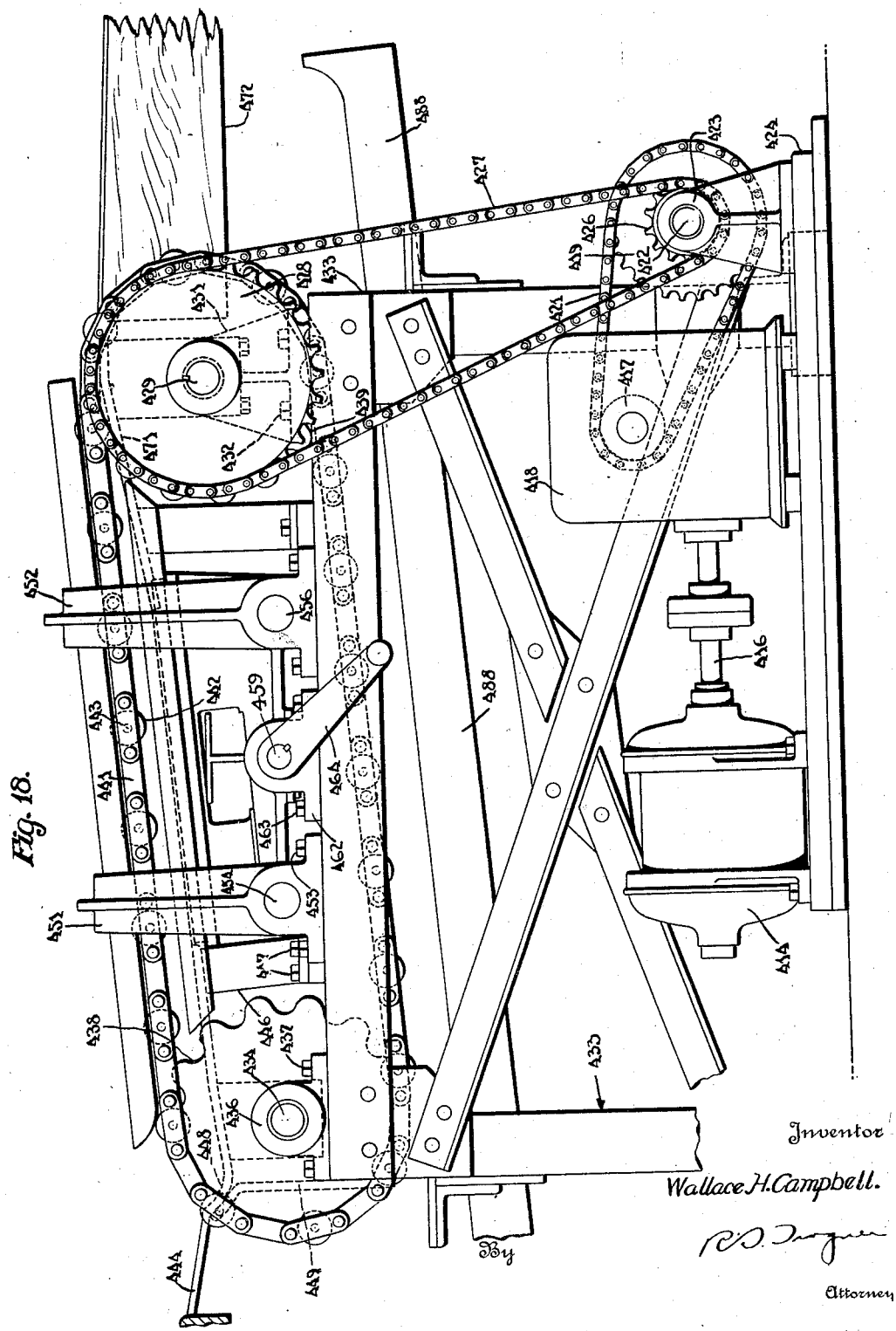

Patented June 7, 1932

1,862,210

UNITED STATES PATENT OFFICE

WALLACE H. CAMPBELL, OF AKRON, OHIO, ASSIGNOR TO THE GOODYEAR TIRE & RUBBER COMPANY, OF AKRON, OHIO, A CORPORATION OF OHIO

APPARATUS FOR MAKING INNER TUBES

Application filed January 14, 1928. Serial No. 246,737.

This invention relates to methods of and apparatus for manipulating sheets or webs and has particular relation to an apparatus of the above designated character for making inner tubes employed in pneumatic tire casings.

The particular embodiment of the invention, hereinafter described in detail and illustrated in the drawings, comprises a calender in which a continuous laminated sheet or web composed of plastic rubber composition is formed. The relatively warm sheet from the calender is festooned about a plurality of driven rollers or drums containing cooling liquid and thereafter it extends in a loop between the rollers and the first of a series of conveyors forming a part of a sheet manipulating apparatus. A first and a second conveyor of the series are operated intermittently, and at substantially the same speed, for transporting a predetermined length of the sheet from the loop in a direction toward a third and last conveyor of the series. A blank of material supported by the second conveyor is severed from the sheet by a cutter located between the adjacent ends of the first and second conveyors, which cutter is operable only during periods when the aforesaid conveyors are at rest. Thereafter, the second and third conveyors are operated simultaneously and at the same speed, for advancing the blank a distance substantially greater than the sheet previously was transported by the movement of the first two conveyors. A repetition of these operations serves to deposit the blanks successively on the third conveyor in spaced relation to each other. During the periods when the third conveyor is at rest, a blank previously transported to a tube rolling station is rolled by attendants at the station in tubular form upon a mandrel. The mandrels, from the conveyor belt, are received by a continuously operating conveyor which rolls the previously formed tube supported thereby upon a pair of adjustably spaced and electrically heated knives. Thereafter the scrap material is removed from the ends of the mandrels by attendants stationed adjacent the conveyor. Other attendants receive the mandrels and tubes from the first conveyor, superpose rubber skiving bands on the ends of the tubes and load the latter on an adjacent truck for transporting them to the vulcanizing apparatus. After the tubes have been cured properly in the vulcanizing apparatus, they are stripped from the mandrels by a machine positioned adjacent the apparatus which discharges the mandrels on a conveyor for returning them to the tube rolling station.

For a better understanding of the invention, reference may now be had to the accompanying drawings, forming a part of this specification, in which:

Fig. 1 is a fragmentary diagrammatical view illustrating one embodiment of the invention;

Fig. 2 is a plan view of the apparatus illustrated by Fig. 1;

Fig. 3 is a fragmentary side elevational view of a sheet severing and spacing apparatus included in the embodiment of the invention;

Fig. 4 is a side elevational view of a remaining portion of the sheet severing and spacing apparatus illustrated by Fig. 3;

Figs. 5 and 6 respectively are plan views of the apparatus as illustrated by Figs. 3 and 4;

Fig. 7 is a cross-sectional view through the frame of the sheet severing and spacing apparatus taken substantially along the line VII—VII of Fig. 5, which view illustrates a side elevational view of a portion of the driving mechanism for the apparatus;

Fig. 8 is a cross-sectional view taken substantially on line VIII—VIII of Fig. 7;

Fig. 9 is a cross-sectional view taken substantially on line IX—IX of Fig. 7;

Fig. 10 is a cross-sectional view taken substantially on line X—X of Fig. 7;

Fig. 11 is a fragmentary plan view of the driving mechanism illustrated by Fig. 7, which view includes a portion in cross-section taken substantially on line XI—XI of Fig. 10;

Fig. 12 is a fragmentary cross-sectional view through the frame of the sheet severing and spacing apparatus taken substantially on line XII—XII of Fig. 5, which view illustrates a side elevational view of the sheet severing mechanism;

Fig. 13 is a cross-sectional view taken substantially on line XIII—XIII of Fig. 12;

Fig. 14 is a fragmentary cross-sectional view taken substantially on line XIV—XIV of Fig. 13;

Fig. 15 is a view in detail illustrating a portion of the sheet severing mechanism shown by Figs. 12 and 13;

Fig. 16 is a fragmentary view illustrating a brake mechanism employed in controlling one of the conveyors of the sheet severing and spacing apparatus;

Fig. 17 is a fragmentary view of the apparatus showing an end elevation of the brake mechanism illustrated by Fig. 16;

Fig. 18 is a fragmentary side elevational view of a tube trimming and delivering apparatus which operates in conjunction with the sheet severing and spacing apparatus, which trimming and delivering apparatus is shown also by Figs. 2 and 6; and Fig. 19 is a fragmentary view illustrating the delivering portion of the apparatus illustrated in Fig. 2.

In practicing the invention, I employ a four-roll laminating calender 20 (Figs. 1 and 2) of standard construction which comprises a plurality of rolls 21, 22, 23 and 24. Rubber composition stock from an adjacent mill (not shown) is supplied respectively between pairs of rolls 21—22 and 23—24 of the calender 20, as indicated at 26 and 27. Relatively thin sheets 28 and 29, formed on portions of the rolls 22 and 23 respectively, are pressed together by the rolls thus forming a continuous, laminated sheet 31. The sheet 31 is delivered upon a plurality of water cooled rolls or drums 32, 33 and 34, which are driven continuously by a power unit (not shown) for operating the calender 20. A loop 36, comprising a portion of the sheet 31, extends between one of the cooling rolls 34 and an adjacent portion of a sheet severing and spacing apparatus 37, which apparatus is operable intermittently at a speed greater than the speed of the rolls 32, 33 and 34. The apparatus 37 thus withdraws the sheet 31 from the loop 36 as rapidly as the sheet is delivered thereto.

A motor 38, (Fig. 3) rigidly mounted on a base plate 39, is employed for driving the sheet severing and spacing mechanism 37. A pinion 41, secured on the motor shaft 42, meshes with a gear 43 mounted on the end of a shaft 44 which extends from within a worm reduction gear case 46 disposed adjacent the motor 38 and likewise secured to the plate 39. A shaft 47 operated indirectly by the shaft 44 extends from the reduction gear case 46 and carries a gear 48 rigidly secured thereon. A chain 49, driven by the gear 48, in turn drives a gear 51 (Fig. 7) mounted on an intermediate portion of a shaft 52, which is journaled, adjacent the gear 51, in a pedestal bearing 53, and, adjacent its opposite ends, in bearings 54 and 56 which are formed in a pair of spaced parallel frame members 57 and 58. A base plate 61 supports the pedestal bearing 53, the pair of frames 57 and 58, and a pair of frames 62 and 63, similar to the frames 57 and 58, and spaced beyond the latter. A sprocket wheel 64 (Fig. 11) rigidly mounted on the shaft 52, drives a chain 66, which in turn drives a sprocket wheel 67 that is mounted rigidly on the end of a shaft 68. A bearing 69, bolted, as indicated at 71, to a bracket 72, which, in turn, is bolted, as indicated at 73, to the frame 57, rotatably supports an end of the shaft 68 adjacent the sprocket wheel 67.

An enlarged portion 74, of the shaft 68, is journaled in ball bearings 76 which are mounted in opposite ends of an elongate sleeve 77. A ball bearing 78, rotatably supporting one end of the sleeve 77, is secured between flanged discs 83, in an opening in a bracket 79, which is bolted, as indicated at 81 to the frame 62. The flanged discs 83 are secured to the bracket 79, by screws 84. A disc 86, secured on the shaft 68, beyond the enlarged portion 74, is provided with a spring pressed detent 87 which is adapted operatively to be disposed within any of a series of openings 88 formed in a hand wheel 89. A hand grip 91, secured to the hand wheel 89, provides suitable means for operating the latter. The hand wheel 89 is keyed on one end of the sleeve 77, while a sprocket wheel 92 similarly is mounted on the opposite end of the sleeve. A chain 93, driven by the sprocket wheel 92, in turn drives a sprocket wheel 94 (Fig. 9) which is rotatably mounted on an end of the shaft 52 adjacent the frame 57.

It is apparent that the angular position of the sprocket wheel 94 may be changed, with respect to the angular position of the shaft 52, by withdrawing the detent 87, and changing the angular position of the disc 86 with respect to the hand wheel 89.

A bevel gear 96, (Figs. 7, 9 and 11) rigidly secured with respect to the sprocket wheel 94 meshes with a beveled pinion 97 which is keyed and secured by a nut 98 on an end of a rod 99. Bearings 101 and 102, formed at opposite ends of a crank 103, rotatably support the rod 99 in a position longitudinally thereof. Collars 104, rigidly secured to the rod 99, at opposite sides of the bearing 101, prevent movement of the rod longitudinally with respect to the crank. The crank 103 is rigidly secured at one of its ends on the end of the shaft 52 supporting the bevel gear 96 and sprocket wheel 94. A block 106, slidably mounted between longitudinal guide portions 107 of the crank 103 operatively engages a threaded portion 108 of the rod 99, that is disposed between the bearings 101 and 102. A crank pin 109, extending normally from the block 106, is provided with a reduced portion 111 (Fig. 8) which is journaled in a block 112. The latter is slidably mounted between guides 113 formed radially with respect to a large gear segment 114. A bearing 116, formed on the segment 114, rotatably supports the latter between a pair of spaced collars 117 which are rigidly mounted on an intermediate portion of a stud shaft 118 that is secured by nuts 119 between the frames 57 and 62.

When the crank 103 is rotated by the shaft 52, the block 112 reciprocates between the guides 113 and the segment 114 is oscillated on the stud shaft 118. The number of degrees which the segment 114 oscillates depends on the longitudinal position of the block 106 with respect to the crank 103. Since the block 106 is mounted on the threaded portion 108 of the rod 99, rotation of the latter by the bevel pinion 97 and the gear 96, resulting from the relative rotation of the disc 86 with respect to the hand wheel 89, varies the position of the block.

The segment 114 meshes with a pinion 121, (Fig. 7) formed on a hub 122 of an internal element 123 of a one-way roller clutch 124. The pinion 121, the hub 122, and the element 123, are rotatably mounted on a shaft 126 which is journaled in bearings 127 formed in the frames 57, 58 and 62. A rod 125, secured in upper portions of the frames 57, 58 and 68, maintains them rigidly together. An external element 128, of the clutch 124, is rigidly secured to the shaft 126. Rollers 129 disposed between teeth 131, formed on the disc 123, are confined between the latter and the external element 128. When the segment 114 is oscillated in the direction of the arrow (Fig. 10), the rollers 129 are confined between the teeth 131 of the disc 123, and the external element 128, thus rotating the clutch 124 in a counter-clockwise direction. However, when the segment moves in the opposite direction, the rollers 129 are released from engagement with the external element 128 and only the internal element 123 is rotated by the pinion 121.

A sprocket wheel 132, rigidly mounted on the shaft 126 adjacent the frame 58, drives a sprocket chain 133, (see Fig. 13) which engages a sprocket wheel 134 (Figs. 12 and 13) mounted rigidly on the end of a sleeve 136. A shaft 137, extending through relatively large openings formed in brackets 144 and 146, is journaled, adjacent its opposite ends, in bearings 138 and 139 resting on blocks 142 which are supported by base portions 143 of the brackets 144 and 146. The sleeve 136 is rotatably mounted on the end of the shaft 137 adjacent the bearing 138. The brackets 144 and 146 are supported respectively by vertical fabricated frames 147 and 148 secured adjacent upper portions thereof by angle bars 149 and 151 to the frames 58 and 57. Lower portions of the frames 147 and 148 are secured by bars 152 and angle brackets 153 to lower portions of the frames 58 and 57 respectively.

A sprocket wheel 154, engaging a reach of the chain 133, is rotatably mounted on a stud bolt 156 which is adjustably secured in a slot 157, formed in a plate 158 which is bolted as indicated at 159 to the angular bar 149. The tension of the chain 133 thus is variable by adjusting the position of the sprocket wheel 154.

An external element of a one-way roller clutch 161 is rigidly secured on the end of the sleeve 136 opposite the sprocket wheel 134 while the internal element of the clutch is rigidly secured to the shaft 137. A relatively large roller 162, mounted intermediate the ends of the shaft 137, and adjacent the sprocket wheel 134, supports a conveyor belt 163, which in turn is supported at its opposite end (Fig. 3) by a similar roller 164, and a pair of relatively small pulleys 166 and 167. The pulley 164 is mounted on a shaft 169 journaled at its opposite ends in bearings 171 secured to upper portions of spaced vertically disposed fabricated frames 172 and 173. An upper portion of the frame 172 is secured to a portion of the frame 58 by a bar 174 while a lower portion thereof is connected to the frame 58 by an angle bracket 177 and a bar 176. The frame 173 similarly is connected to the frame 57 by bars 178 and 179 and a bracket 181. The roller 167 is mounted on a shaft 182, which is journaled at its opposite ends in brackets 183 that are secured to the frames 172 and 173. The location of the roller 167 with respect to the roller 164 is such that the upper reach of the belt 163 extends a short distance beyond the roller 164 substantially in a straight line. The roller 166 is mounted on a shaft 184 journaled at its opposite ends in brackets 186 likewise secured to the frames 172 and 173. The roller 166 is so positioned with respect to the roller 164 as to provide the maximum purchase of the belt 163 against the roller 164 without engaging the upper reach of the belt extending therebeyond. A tightening roller 168 (Fig. 16) engaging a lower reach of the belt 163 is mounted on a shaft 187 journaled at opposite ends in blocks 188 slidably mounted between vertical guides 189 secured to the frames 172 and 173. Rods 191, threaded within a portion of the guides 189, are rotatably secured at one end in the blocks 188. The rods thus serve to adjust the horizontal position of the roller 168.

When the movement of the segment 114 in the direction of the arrow (Fig. 10) causes the rigid engagement of the elements of the clutch 124, the chain 133 so rotates the sprocket wheel 134 and sleeve 136 as to drive the shaft 137 through the clutch 161. Consequently the upper reach of the belt 163 is driven, by the roller 162, in the direction of the pulley 164. The motion imparted to the belt 163 by the aforesaid movement of the segment 114 obviously is proportional to the length of the crank 103 which is varied by the manipulation of the disc 86 and the hand wheel 89 as hereinbefore described.

A crank 194, (Figs. 7 and 8) mounted in a plane with the crank 103 at the opposite end of the shaft 52, is provided with a pin 196 which is rotatably journaled in a block 197 slidably mounted between guides 198 formed rigidly in a gear segment 199. The latter segment is similar in construction to the segment 114 hereinbefore described. A bearing 201, formed on the segment 199, rotatably receives a stud shaft 202 which is secured, by nuts 203, between upper portions of the frames 58 and 63. A pinion 204, meshing with the teeth of the segment 199, is mounted rigidly on a sleeve 206 that is secured to the internal element 207 of a one-way roller clutch 208. The external element 209 of the clutch 208 is rigidly mounted on a shaft 211 upon which the sleeve 206 is journaled, the shaft in turn being journaled in bearings 212 formed in the frames 57, 58 and 63. Since the segments 199 and 114 are disposed oppositely with respect to the pinions 204 and 121, it is apparent that a movement of the segments in the same direction will result in the rotation of pinions 204 and 121 in opposite directions. Since the clutches 208 and 124 are similarly arranged with respect to the pinions 204 and 121, the shafts 211 and 126 alternately are rotated in the same direction.

From an inspection of Fig. 8, it will be observed that a plane containing the axes of the shafts 118 and 202 is disposed at one side of the shaft 52 and that it approximately is tangent to the circle of motion of the crank pins 111 and 196. Consequently, during each revolution of the pins 111 and 196, the direction of motion of the segments 114 and 199 will be reversed simultaneously when the motion of the pins, with respect to the aforesaid plane is reversed. Hence the rotation of the shaft 211 will be discontinued, and the rotation of the shaft 126 will be initiated simultaneously. However, as the rotation of the pins continues, the circle of motion of the pin 111 will become tangent to a radius of the segment 114 through the pin 111 substantially before the circle of motion of the pin 196 becomes tangent to a radius of the segment 199 through the pin 196. Consequently, since the direction of motion of the segment 114 is reversed before that of the segment 199, the positive rotation of the shaft 211 is discontinued before that of the shaft 126 is initiated. Thus, for a substantial period of time intermediate these two events, during which time the segments 114 and 199 are moving in opposite directions, neither of the shafts 126 nor 211 is driven positively by the segments. However, as soon as the circle of motion of the pin 196 becomes tangent to a radius of the segment 199, the direction of motion of the latter is reversed and consequently the shaft 211 is rotated.

A sprocket wheel 216 (Fig. 7) rigidly mounted on the shaft 211, transmits the intermittent rotative movement of the shaft, through a chain 217 (Figs. 3 and 5) to a sprocket wheel 218 which is rigidly mounted on a sleeve 219. The latter is rotatably mounted on the shaft 169 between one end of the roller 164 and one of the bearing blocks 171. The sleeve 219 is rigidly secured to an internal element of a one-way roller clutch 221, the external element of which is rigidly secured to the shaft 169. When the shaft 211 is rotated by the clutch 208, the movement is transmitted by the chain 217 and the clutch 221 to the shaft 169 and the roller 164. It is apparent that the upper reach of the belt 163 intermittently is driven in a direction toward the roller 164 by the alternate rotation of the shafts 211 and 126, which impart motion to the belt through the several chains and clutches associated therewith. The external element of the clutch 221 and the sleeve 219 obviously remain stationary while the external element of the clutch 161 and the sleeve 136 rotate. Likewise, the external element of the clutch 161 and the sleeve 136 are stationary while the external element of the clutch 221 and the sleeve 219 are rotated. Since the shafts 126 and 211 simultaneously are stationary for an instant and for a substantial period of time during each revolution of the cranks 194 and 103, the belt 163 likewise is stationary for corresponding periods.

A sprocket wheel 222, secured on the sleeve 136, adjacent the clutch 161, drives a sprocket chain 223, which in turn, drives a sprocket wheel 224 that is rigidly mounted on a shaft 226. This shaft extends through openings formed in the brackets 144 and 146 and is journaled adjacent its opposite ends in bearings 227 and 228 that are spaced substantially above the horizontal plane of the bearings 138 and 139 supporting the shaft 137. The bearings 227 and 228 are supported upon blocks 229 rigidly secured to the base portion 143 of the brackets 144 and 146. A roller 231, rigidly mounted on the shaft 226 between the brackets 144 and 146, supports one end of a belt conveyor 232. A roller 233, (Figs. 3 and 5) supporting the opposite end of the belt 232, is rigidly mounted on a shaft 234, journaled at opposite ends in bearing blocks 236, which in turn are slidably mounted in horizontally disposed guide frames 237. A pair of vertically disposed fabricated frames 238 and 239, supporting the guide frames 120

237, are rigidly connected to the frames 147 and 148 by a plurality of angle bars 241. Threaded rods 242 extending longitudinally of the guide frames 237 extend through threaded openings formed in the ends of the latter and rotatably engage the blocks 236. Lock nuts 243 positioned on the rods 242 provide means for adjustably securing the blocks 232 in any desired position longitudinally of the guide frames 237. Thus by manipulating the lock nuts 243 and the rods 242, the belt 232 may be adjustably tensioned. Arcuate lugs 240 extending vertically from the ends of the guide frames 237 beyond the end of the conveyor belt 232 rotatably support a small roller 245.

A sprocket wheel 246, rigidly mounted on the shaft 226 between the roller 231 and the frame 144, drives a chain 247 which in turn drives a sprocket wheel 248 rigidly mounted on a shaft 249. This shaft is rotatably mounted at opposite ends in journal blocks 251 (Fig. 12) which are rigidly secured to the frames 144 and 146. A small roller 252, rigidly secured on the shaft 249, is supported by the bearing blocks 151, at equal distances from the rollers 231 and 162 and with its upper surface substantially tangent to the plane of the upper reach of the belt 232 extended beyond the pulley 231.

A sprocket wheel 253, (Figs. 3 and 5) mounted on the sleeve 219 adjacent the clutch 221, drives a sprocket chain 254 which in turn drives a sprocket wheel 256, that is rigidly mounted on a shaft 257 journaled at opposite ends in bearings 258 rigidly secured to the fabricated frames 172 and 173. A roller 259 rigidly mounted on the shaft 257 supports one end of a relatively long belt conveyor 261. The opposite end of the belt 261 is supported rotatably by a roller 262 mounted on a shaft 263 which is journaled at opposite ends in blocks 264 slidably mounted in horizontally disposed guide frames 266. The guide frames 266 are similar in purpose and construction to the guide frames 237, and accordingly, a repetition of the description thereof is unnecessary.

The guide frames 266 are supported by spaced vertically disposed fabricated frames 267 and 268, the upper portions of which are connected to the frames 172 and 173 by relatively long angle bars 270 and 271. Vertically disposed bars 272 are secured at their upper ends to intermediate portions of the bars 270 and 271 while the lower ends thereof are secured by bars 273 to lower portions of the frames 172 and 173. Angularly disposed bars 274 secured between the upper ends of the bars 273 and lower portions of the frames 172 and 173 provide bracing members for the structure. Horizontally disposed bars 275, provided with vertically disposed struts 276 intermediate the ends thereof, connect intermediate portions of bars 272 to the frames 267 and 268.

A plurality of grooved rollers 277 arranged in spaced pairs and rotatably mounted on the frame structure of the apparatus adjacent the belts 232, 163 and 261, provide suitable means for maintaining the latter in a central position upon their respective supporting rollers.

Since the sleeve 136 is connected positively by a chain 223 to the roller 231, the belt 232 consequently is rotated simultaneously therewith in response to the rotation of the shaft 126. The shaft 126 also drives the belt 163 simultaneously with the belt 232 through the clutch 161 and the roller 162. During this period of movement, the clutch 221 is inoperative for rotating the sleeve 219 and hence the conveyor 261 remains stationary. A substantial period of time after the shaft 126 ceases its rotation the rotation of the shaft 211 is initiated, as hereinbefore described, and the conveyor belts 163 and 261 are driven simultaneously by the positive operation of the clutch 221 while the sleeve 136 and consequently the belt 232 remain stationary.

A sprocket wheel 278, (Fig. 7) rigidly mounted on the continuously rotating shaft 52, drives a sprocket chain 279, (Figs. 12 and 13), which in turn drives a sprocket wheel 280 rotatably mounted on a stud shaft 285 secured by nuts 281 in a bracket 282 rigidly mounted on a portion of the frame member 147. The diameter of the sprocket wheel 280 is twice as great as the diameter of the sprocket wheel 278 and hence the angular speeds thereof are universally proportional. Accordingly, the wheel 280 makes only one revolution for every two of the shaft 52.

A sprocket wheel 283, rotatably mounted on the shaft 285, and rigidly secured upon the hub of the sprocket wheel 280, drives a chain 284 which in turn drives a sprocket wheel 286. A shaft 287, having the sprocket wheel 286 rigidly secured thereto, is rotatably mounted in journal bearings 288 formed in the frame members 144 and 146. A sprocket wheel 289 (Fig. 12) mounted adjacent the opposite end of the shaft 287 drives a sprocket chain 291 which in turn drives a sprocket wheel 292 rigidly secured to a shaft 293, which shaft is journaled in bearing brackets 294 (Fig. 5) rigidly secured to the frames 144 and 146. The diameter of the sprocket wheel 289 is twice the diameter of the sprocket wheel 292 and hence the angular speed of the shaft 293 is twice that of the shaft 287 or equal to the angular speed of the shaft 52. During one complete cycle of operation of the conveyor belts 232, 163 and 261, the shaft 293 rotates 360° while the shaft 287 rotates 180°.

Similar cams 296 (Fig. 13) rigidly secured in corresponding angular positions adjacent opposite ends of the shaft 293, engage rollers 297 rotatably mounted on pins 298 secured in the ends of levers 299. The levers are pivotally mounted intermediate the ends thereof on pins 301 mounted in brackets 302 secured to the frames 144 and 146. Springs 303 secured between the ends of the levers 299 remote from the rollers 297 and to the frames 147 and 148, maintain the rollers permanently in engagement with the cams 296. Links 304 pivotally mounted at opposite ends on pins 306 and 307 connect the ends of the levers 299 beyond the springs 303 to lugs 308 formed on the lower ends of flanged sleeves 312.

The sleeves 312 are slidably mounted in openings formed in the lower ends of spring cages 309, which are adapted to be engaged by flanges 310 formed on the sleeves 312. The lower ends of rods 311 are slidably journaled within the sleeves 312 and also within openings formed in upper portions of the cages 309. Flanged collars 313, rigidly secured by pins 315 to the rods 311, within the cages 309, engage one end of springs 314 surrounding the rods 311, which are in turn supported at the opposite ends thereof by the flanges 310 of the sleeves 312. The rods 311 are slidably journaled, intermediate the ends thereof, in bushings 316 mounted in openings which are formed in blocks 317 rigidly secured to the frames 144 and 146. Beyond the bushings 316, the rods 311 project within recesses 318 formed in the blocks which are adapted to receive slidably the opposite ends of a bar 319 that is pivotally connected to the ends of the rods 311 by pins 321. Plates 320 and 322, partially covering the upper ends of the blocks 317, and the recesses 318 formed therein, are secured to the blocks by bolts indicated at 323. Notches 324 are so formed in the upper surface of the bar 319 that the upper surfaces of the plates and the bar are co-linear. The blocks 317 are so secured with respect to the frames 144 and 146 that the upper surfaces of the plates 320 and 322 are disposed in a plane slightly below and parallel with a plane tangent to the rollers 162 and 252 at the sides thereof remote from the belt 232.

From the foregoing description, it is apparent that the rods 311 are reciprocated toward and away from the plates 320 and 322 during each cycle of operation of the conveyor belts 232, 163 and 261. The cams 296 are so positioned on the shaft 293 that the upper surface of the bar 319 is co-extensive with the upper surfaces of the plates 320 and 322 immediately after the advancing movement of the belts 232 and 163, where it remains during the substantial period of time prior to the simultaneous operation of the conveyors 163 and 261.

A cam 331, (Figs. 12 and 15) rigidly secured on the shaft 287, between the sprocket wheel 286, and one of the bearings 288, operatively engages a roller 332 that is rotatably mounted on a pin 333 secured in the bifurcated end 334 of a vertically disposed rod 336. The latter is slidably disposed in bushings 337 secured in an opening formed in a block 338 which is secured rigidly to the bracket 144.

A spring 339, extending within a recess 341 formed transversely of the block in a lower portion thereof, is compressed between the block and a shoulder formed by the bifurcated end 334 of the rod 336. A rack 342, secured to an end of the rod 336 extending above the block 338 meshes with a small gear 343 rigidly mounted on a stem 344 extending from a casing 346 of a rotary valve 347. A bracket 345, bolted, as indicated at 350, to the frame 144, rigidly supports the valve 347. A conduit 348 connected to the casing 346 of the valve 347 communicates, through a conduit 349, with a compressed air storage tank 351, which is supplied by a conduit 352 controlled by a valve 353, with air from a compressor, not shown. A gage 354, connected in the conduit 349, indicates the pressure of the air as it is supplied to the valve. A nipple 356, secured in the casing 346 opposite the conduit 348 provides an exhaust port for the valve. Conduits 357 and 358 communicate at one end with oppositely disposed ports of the valve casing 346 while the opposite ends thereof are connected to the opposite ends of a rod 359 (Fig. 12). Brackets 361, having the opposite ends of the rod 359 rigidly mounted therein, are bolted, as indicated at 362, to the upper surfaces of recessed blocks 363 (Figs. 12 and 13) which are in turn bolted as indicated at 364 to the upper surfaces of the brackets 144 and 146.

Spaced openings or ports 366 and 368, formed in the rod 359 at points substantially equidistant from the opposite ends thereof, communicate respectively with the conduits 357 and 358 through longitudinally disposed openings formed in the rod. A piston 369, provided with suitable packing washers or gaskets 371 secured in the opposite ends thereof by screws 372, is rigidly mounted on the rod 359 between the ports 366 and 368. An elongate cylinder 373, slidably mounted on the piston 369, is provided with heads 374 and 376 at opposite ends thereof through which the rod 359 extends. Packing glands 377 associated with the heads prevent the escape of fluid from the cylinder 373 through the opening provided for the rod 359. Springs 375 are disposed on the rod 359, on opposite sides of the piston 369, for engaging the heads 374 and 376 when the latter approach the piston 369. A bifurcated yoke 378, clampingly engaging the cylinder 373 adjacent the head 374 carries a pin 379 rotatably supporting a small gear 381. A horizontally disposed stationary rack bar 382, arranged above the gear 381 and meshing therewith, is bolted at opposite ends, as indicated at 383, upon blocks 384 which are in turn bolted as indicated at 386 upon the upper surfaces of a pair of horizontal guide bars 387. The opposite ends of the guide bars 387 are rigidly secured in the recessed blocks 363.

A rack bar 388, disposed in parallel relationship with respect to the rack bar 382, and likewise meshing with the gear 381, is slidably mounted between the guide bars 387. Blocks 385, disposed between the guide bars 387, form stops for engaging the opposite ends of the rack bar 388. A tool head 391 secured beneath one end of the rack bar 388, is provided with a reduced sleeve portion 392 surrounded by a spring 393 which is compressed between the head 391 and a flange 394, formed on a tool holder 396 which is slidably mounted adjacent its upper end in the sleeve 392. A disc cutter 397 is rotatably mounted on a pin secured in the tool holder 396. The angular disposition of the head 391 is such that the cutter 397 is substantially co-extensive with the plane of the rods 311. The cutter 397 normally is supported by one of the plates 320 or 322 depending on the position of the cylinder 373. The valve 347 is so constructed as to provide communication between the conduits 357 and 358 and the supply conduit 348 and the exhaust port 356 alternately. Assuming the rod 336 to have been elevated by the cam 331, the conduit 358 to be in communication with the supply conduit 348, and the conduit 357 to be in communication with the exhaust port 356, then the cylinder 373 is urged into a position on the rod 359 at the end thereof adjacent the bracket 144 and the cutter 397 is supported by the plate 320.

The cam 331 is so disposed on the shaft 287 with respect to the cams 296 on the shaft 293 that when the latter cams cause the elevation of the upper surface of the bar 319 in the plane of the upper surfaces of the plates 320 and 322, the cam 331 initiates a change in the position of the valve 347. Immediately thereafter, the differential pressure on opposite sides of the piston 369 is reversed and the cylinder is urged toward the opposite end of the rod 359 thus carrying with it the pinion 381 which is rotated by engagement with the rack 382. Thus the rack 388 is driven toward the opposite ends of the guide bars 387 at a rate equal to the sum of the linear and peripheral speeds of the pinion 381. Consequently the cutter 397 is rolled across the bar 319 and is brought to rest on the plate 322 by the aforesaid movement of the rack 388. Thereafter, the cams 296 permit the bar 319 to move downwardly under the influence of the springs 303, where it remains during the remainder of the revolution of the shaft 293. At the beginning of the succeeding revolution of the shaft 293, the bar 319 is returned to its original position against the blocks 320 and 322 and the cam 331 permits rotation of the valve 347 into its opposite position thus returning the cutter 397 to its original position upon the plate 320. The cutter 397 moves across the bar 319 to the opposite plate once during each cycle of operation of the conveyors 232, 163 and 261. This movement of the cutter occurs during the substantial lapse of time occurring between the simultaneous operation of the conveyors 232 and 163 and the conveyors 163 and 261.

The conveyor 261 is composed of two separate belts 401 and 402, the latter being superpositioned upon the former. The lower reaches of the belts are slightly elevated by idle rollers 403, 404 and 406, which rollers are rotatably mounted in brackets 407 secured to adjacent portions of the machine frame. A portion of the upper reaches of the belts is supported by a plurality of rollers 408 rotatably mounted in blocks 409 supported by the bars 270 and 271. Spaced rollers 411 extending between the belts 401 and 402 are rotatably mounted between the bars 270 and 271 in a plane substantially below the upper reaches of the belts 402. A portion of the upper reach of the belt 402 separated from the belt 401 by the rollers 411 is supported adjacent its edges by elongate rails 412 and 413 mounted on the frame bars 271 and 270 respectively. The rails 412 and 413 each extend a substantial distance beyond the edges of the belt 402.

A motor 414, (Fig. 18) positioned adjacent one end of the rail 413, is provided with a shaft 416 which, through a worm reduction gear 418, drives a sprocket wheel 417. A sprocket wheel 419, driven from the sprocket wheel 417 by a chain 421, is rigidly mounted on a shaft 422 rotatably mounted in journal bearings 423 arranged at opposite ends of the shaft and secured to a base plate 424 which also supports the reduction gear 418 and the motor 414. A sprocket wheel 426, secured on the shaft 422 adjacent the sprocket wheel 419, drives a chain 427 which in turn drives a sprocket wheel 428 rigidly mounted on an end of a shaft 429. This shaft is journaled at opposite ends in bearings 431 bolted as indicated at 432 to a fabricated frame 433. The frame 433 is positioned adjacent the conveyor 261 and is disposed perpendicularly with respect to the rails 412 and 413. A shaft 434, disposed on the end of the frame 433 opposite the shaft 429, is journaled in bearings 436 which are positioned at opposite ends of the shaft, and bolted, as indicated at 437 to an upper portion of the frame 433.

Spaced pairs of sprocket wheels 438 and 439, rigidly disposed adjacent opposite ends of the shafts 434 and 429 respectively are adapted operatively to engage a pair of sprocket chains or conveyors 441 extending between one sprocket wheel of each pair. Rollers 442 are rotatably mounted on the adjacent sides of the chains 441 upon spaced pins 443 secured rigidly in alternate links of the chains. Spaced bars 444, extending from opposite ends of the rail 413 between the chains 441 and substantially below a portion of the upper reaches thereof, are rigidly supported at the ends thereof remote from the rail 413 by brackets 446, which are bolted, as indicated at 447 to the frame 433. A depression 448 is formed in each of the bars 444, intermediate the ends thereof, at points immediately adjacent a line between the chains intersecting the bars.

Vertically disposed bars 449 secured to the frame 433 also support the bars 444 adjacent the depressions 448. Vertically disposed pairs of brackets 451 and 452 bolted to the frame 433, as indicated at 453, rigidly support opposite ends of a pair of spaced rods 454 and 456 which extend across the frame adjacent and perpendicular to the ends of the bars 444. Spaced blocks 457 and 458 extending transversely with respect to the rods 454 and 456 are slidably journaled adjacent the opposite ends thereof upon the rods. A rod 459, having oppositely threaded portions 461 adjacent the ends thereof which engage the blocks 457 and 458 between the rods 454 and 456, is rotatably mounted adjacent its opposite ends in bearing blocks 462 bolted, as indicated at 463, to the frame 433. A crank 464, rigidly mounted on one end of the rod 459 provides means for rotating the latter within its bearings 462.

It is apparent that the blocks 457 and 458 will be moved in opposite directions during the rotation of the rod 459 thus rendering possible the variable spacing of the blocks. A pair of knives 466 and 467 projecting vertically from the upper surface of the blocks 457 and 458 are provided with portions 468 parallel to the chains 441 and diverging portions 469 extending from the ends thereof adjacent the bars 444. The knives 466 and 467 are insulated with respect to the blocks 457 and 458 and are provided with terminals, not shown, for connecting the knives in an electrical heating circuit. The knives 466 and 467 are composed of any suitable metal having a relatively high resistance and hence are adapted to be heated substantially by a current of electricity. Spaced rails 471 supported by the frame 433 are positioned beyond the ends of the blocks 457 and 458 remote from the rails 444. The upper surfaces of the rails 444 and 471 and the upper edges of the knives 466 and 467 are substantially co-linear and parallel to the upper reaches of the chains 441. During the operation of the motor 414, the upper reaches of the chains move progressively across the rails 444, the knives 466 and 467, and the rails 471.

Spaced rails 472 extending beyond the ends of the rails 471 are supported at one end on the frame 433 while the remaining portions of the rails are supported by a frame 473. A plurality of blocks 474 (Fig. 19) arranged along the edges of the rails 472 are pivotally mounted on a plurality of spaced pins 476 secured in the rails. The ends of the blocks 474 adjacent the frame 433 are resiliently urged against pins 477 rigidly mounted in the rails 472 by springs 478 secured between the blocks and the rails 472. The upper surfaces of the blocks 474 comprise angularly disposed portions 479 and 480 which alternately extend upwardly above the upper surfaces of the rails 472. Beyond the end of the rails 472, brackets 481, secured to the latter, pivotally support rock levers 482 which are mounted on pins 483 journaled in the levers 482 intermediate the ends thereof. The opposite ends 484 and 485 of the levers 482 are disposed with respect to each other at angles less than 180°. The ends 485 are resiliently urged downwardly by springs 486 secured to the extremities thereof and to the rails 472. Arms 470, secured to the frame 473, beyond the end of the rails 472, are provided with stops 475 which are so disposed at the extreme ends thereof that a mandrel positioned thereagainst also will engage the ends of the levers 482. When the ends 484 of the levers 482 are engaged by a mandrel, the ends 485 of the latter are pivoted upwardly, thus preventing more than one mandrel from being discharged from the rails 472 upon the arms 470. Likewise the mandrels are spaced, relative to each other upon the rails 472 by the similar operation of the blocks 474. A tube stripping machine 487, similar to the machine disclosed in the copending application of Herman T. Kraft, Serial No. 183,427, filed April 13, 1927, now Patent 1,755,065, issued Dec. 6, 1929, has its mandrel discharging end indicated at 487. This machine automatically removes the cured inner tubes from mandrels supplied thereto and thereafter discharges the latter between the frames 433 and 473 upon the ends of spaced rails 488 which are inclined in a direction toward the conveyor 261. The rails 488 are rigidly supported between the side members of the frame 433 and at the opposite ends thereof by the horizontally disposed bar 275 at the opposite side of the conveyor 261. Stops 489, arranged at the lower ends of the rails 488 are rigidly secured to the bar 275 supporting the latter.

A conduit 491 (Figs. 12 and 13) connected to the supply conduit 349 and controlled by a valve 492 is bifurcated to form conduits 493 and 494 which extend downwardly along the inner surfaces of the brackets 144 and 146 respectively, within the space between the rollers 231 and 162. A perforated conduit 496 connecting the ends of the conduits 493 and 494 discharges a blast of air, substantially in the form of a sheet, between the roller 252 and the bar 319, continuously during the operation of the machine.

A brake mechanism 497 (Figs. 7 and 10) is actuated by a cam 498, which is rigidly secured on the shaft 52 between the sprocket wheel 64 and the frame 57. This cam operatively engages a roller 499 rotatably mounted on a pin 501 which is secured in the bifurcated end of a lever 502. A stud bolt 503 secured in the frame 57 pivotally supports the lever 502 intermediate its ends. The opposite end of the lever 502 is bifurcated for receiving a vertically disposed rod 506, which is slidably mounted adjacent the lower end thereof in a bracket 507 bolted, as indicated at 508 to the frame 57. The upper end of the rod is slidably mounted in a sleeve 509 which is threaded within a bracket 511 which is bolted, as indicated at 512 to the frame 57. An oppositely disposed pair of lugs 513 extending normally from the rod 506 engage the upper surface of the lever where it surrounds the rod. A spring 514 surrounding the rod 506 is compressed between the lugs and the lower end of the sleeve 509. Manual adjustment of the sleeve 509 varies its position longitudinally with respect to the bracket 511 and consequently varies the compression of the spring 514 as desired. A brake shoe 516, pivotally supported on a pin 517 mounted in the lower end of the rod 506, operatively engages a flanged disc 518 which is rigidly mounted on the shaft 211. When the rotation of the cam 498 permits the movement of the roller 499 upwardly with respect to the shaft 52, the spring 514 urges the shoe 516 against the disc 518. The resulting friction thus tends to prevent the rotation of the shaft 211. The angular disposition of the cam 498 upon the shaft 52 is such that the shoe 516 engages the disc 518 substantially when the shaft 211 ceases to be driven positively by the clutch 208.

A brake mechanism 519, similar in construction and operation to the brake mechanism 497 previously described, is actuated by a cam 521, which is rigidly secured on the shaft 52 between the crank 194 and the frame 58. The brake mechanism 519 operatively engages a flanged disc 522 rigidly mounted on the end of the shaft 126 adjacent the gear 132 and beyond the frame 58. The annular disposition of the cam 521 on the shaft 52 is such that the brake mechanism 519 tends to prevent rotation of the shaft 126 substantially when the latter ceases to be positively rotated by the clutch 124.

A small roller 523 (Fig. 13) extending transversely to the conveyor 163 is journaled at opposite ends in the ends of bars 524 which are rigidly secured at the opposite ends thereof to a rod 526. Brackets 527 bolted, as indicated at 528 to the brackets 144 and 146 rotatably support the rod 526. A bar 529 disposed angularly with respect to the bars 524 is rigidly secured at one end to an end of the rod 526 which extends beyond the bracket 527 secured to the bracket 144. A stop 531, secured to the machine frame adjacent the bracket 144 serves to prevent excessive movement of the bar 529. A slot 532 formed at one end of a bar 533 slidably receives a pin 534 secured in the end of the bar. A spring 536 surrounding the bar 533 is adapted to be compressed between the end of the bar 529 and a collar 537 which is rigidly secured to the bar 533 a short distance from the slot 532. The opposite end of the bar 533 is pivotally secured by a pin 538 to the end of one of the arms 539 of a bell crank lever 541.

A pin 542, rotatably mounted in a bracket 543, which is secured to the frame bar 149, supports the bell crank lever 541. A spring 544 is secured between the pin 538 and the frame bar 149 adjacent the end of the latter remote from the bracket 144. A roller 546, rotatably mounted on a pin 547 secured in an end of an arm 548 comprising a portion of the bell crank lever 541, is adapted operatively to engage an adjacent edge of the oscillating segment 199. The bell crank lever 541 is oscillated by the segment 199, thus moving the roller 523 alternately toward and away from the conveyor belt 163. The aforesaid mechanism is so adjusted relative to the motion of the segment 199 that the roller 523 engages the belt 163 slightly before the limit of its movement in this direction. The spring 536 thus is compressed and the roller is urged resiliently against the conveyor 163. The roller 523 is so timed with respect to the conveyors 232, 163 and 261 that it engages the conveyor 163 substantially at the end of the period of operation of the conveyors 232 and 163 and remains in engagement therewith during the operation of the cutter.

A roller 549 (Fig. 3) positioned immediately beyond the end of the conveyor 163 and adjacent the roller 167, is rotatably mounted at opposite ends in the ends of bars 551 which are secured at the opposite ends thereof to a rod 552. Brackets 553 secured to the frame bars 270 and 271 rotatably support opposite ends of the rod 552. A bar 554, disposed substantially perpendicularly to the bars 551, is rigidly secured to one end of the rod 552 while the opposite end of the bar is pivotally connected to one end of an elongate rod 556. A lever 557, pivotally connected at one end to the opposite end of the rod 556, is pivotally mounted intermediate its ends in a bracket 558 which is secured to the frame bar 174. The opposite end of the lever 557 slidably engages the side of the segment 199 opposite to that engaged by the roller 546. The lever 557 thus is oscillated by the segment 199 and consequently the roller 549 is alternately moved toward and away from the conveyor 261. The movement of the roller 549 is so timed with respect to the operation of the conveyor belts 232, 163 and 261 that it approaches the conveyor belt 261 immediately prior to the termination of the operation of the conveyors 163 and 261.

A cam 559 (Figs. 7, 16 and 17) is adjustably secured by bolts 561 upon the shaft 52 between the sprocket wheel 64 and the pedestal 53. The cam operatively engages a roller 562 which is rotatably mounted on a pin 563, secured in the bifurcated end of a bell crank lever 564. A block 566, rigidly supported by the frame 57 carries a pin 567 upon which the bell crank 564 is pivotally mounted. A rod 568, which is adjustable in length, as indicated at 569, connects the end of the bell crank lever 564 opposite the roller 562 to a pin 571, which is secured between a pair of lugs 572 that are formed at the end of a rod 573. The latter extends through an opening formed intermediate the ends of a lever 574 which is pivotally supported adjacent its lower end on a pin 576. A bracket 577 bolted, as indicated at 578 to a portion of the frame of the machine, supports the pin 576.

A spring 579, surrounding the end of the rod 573 beyond the lever 574, is confined between the lever and a washer 581 secured by a nut 582 which engages the end of the rod 573. A bar 583, having pins 584 secured in the opposite ends thereof, pivotally connects the upper end of the bar 574 to the lower end of a lever 586 which is pivotally supported at its upper end on a pin 587. A bracket 588 bolted, as indicated at 589, to the fabricated frame 172 rigidly supports the pin 587. A brake band 591, pivotally secured at one end on a pin 592, which is mounted in the lever 586 intermediate the ends thereof, operatively engages a drum 593 which is rigidly secured on the shaft 169 adjacent the end of the roller 164. The opposite end of the brake band 591 is pivotally secured on a pin 594 which is rigidly mounted in the bracket 588 at a point substantially above the fulcrum pin 587 of the lever 586. The configuration of the cam 559 is such that the brake band 591 is tightened on the drum 593 whenever, in the cycle of operations of the conveyors 232, 163 and 261, the conveyor 163 is not in motion.

The conveyor 163 is of sufficient length to accommodate, upon the upper reach thereof, a length of sheet which may be required for the formation of a tube of maximum length, and at the same time providing a substantial space between the end of the sheet and the conveyor 261. The conveyor 261 is substantially twice the length of the conveyor 163 in order to accommodate a plurality of blanks severed thereon having substantial spaces therebetween.

In the operation of the apparatus, the end of the sheet 31 formed by the calendar 20 is supported constantly by the conveyor 232. During the period in which the conveyors 232 and 163 are driven simultaneously a predetermined length of the sheet is transported upon the conveyor 163. During the substantial period prior to the simultaneous operations of the conveyors 163 and 261, the cutter 397 severs a tube rolling blank 596 from the portion of the sheet supported by the conveyor 163. Thereafter, during the operation of the conveyors 163 and 261, the blank is advanced upon the conveyor 261 until only a portion thereof, immediately adjacent the previously severed end, is supported by the conveyor 163. A repetition of the aforesaid operations of the conveyors 232 and 163, and the cutter places a second blank upon the conveyor 163 which is advanced as hereinbefore described into a position upon the conveyor 261 while the first blank is transported into a position adjacent the rails 412 and 413. A mandrel 597 supported upon the portion of the rail 412 projecting from beneath the conveyor 401 is rolled by station attendants across the blank and the conveyor into the depression 448 in the rails 444. The rollers 442 carried by the chains 441 thereafter engage the opposite ends of the mandrel and roll it along the upper surfaces of the rails. The blank 596 adhering to the mandrel 597 as it is thus transported by the chains 441 eventually is engaged by the heated knives 466 and 467 which trim the surplus material from the ends of the tube. Attendants stationed immediately beyond the knives remove the waste material from the ends of the mandrel and it is deposited on the inclined rails 472 where, under the influence of gravitational force it rolls toward the opposite ends thereof. As it engages the projecting portions 480 of the blocks 474, it pivots the latter upon the pins 476 in opposition to the slight force exerted by the springs 478 and thus eventually arrives at the stops 475 at the ends of the arms 470. Attendants at this station apply skiving discs or bands to the ends of the tube after which the mandrels are loaded upon an adjacent truck, not shown. When the truck is loaded with tubes supported by the mandrels, it is rolled into a conventional vulcanizing apparatus where the tubes are cured. After the curing operation, the truck is positioned adjacent the tube stripping machine 487 where the tubes are removed automatically from the mandrels. The latter are discharged from the end of the machine 487 upon the inclined rails 488 where they roll under the influence of gravitational force to the opposite ends of the rails against the stops 489. The mandrel adjacent the stops is seized by the attendants at the tube rolling station positioned on the rail 412 to be rolled upon a succeeding blank on the conveyor 261.

From the foregoing description, it is apparent that the invention is embodied by an apparatus and method which may be advantageously employed in the production of inner tubes for pneumatic tire casings on a relatively large scale. The several automatic features of the apparatus, and the numerous operations which may be dispensed with by its employment, make possible the production of such articles at a relatively low cost as compared with the production cost obtained by the employment of apparatus and methods previously known.

Although I have illustrated but the preferred form which my invention may assume and have described that form in detail, it will be apparent to those skilled in the art that it is not so limited but that various modifications may be made therein without departing from the spirit of the invention or from the scope of the appended claims.

What I claim is:

1. An apparatus for rolling rubber tubes comprising an endless conveyor operable intermittently for delivering successive blanks of sheet rubber to a tube rolling station, a spaced pair of cutters adjacent the conveyor and means for transporting the tubes, rolled at the station, transversely to the conveyor in rolling engagement with the spaced pair of cutters for trimming the ends thereof.

2. Apparatus for making inner tubes comprising means for providing a sheet of rubber, a conveyor for advancing the end of a sheet, a cutter for severing the sheet, a rack mounted on the cutter, a stationary rack parallel to the first rack, a pinion rotatably mounted in a head and operatively engaging the racks and means for moving the head longitudinally of the racks.

3. Apparatus for making inner tubes comprising means for providing a sheet of rubber, a conveyor for advancing a sheet, a relatively stationary rod mounted adjacent the conveyor, a piston rigidly secured on the rod, a fluid tight cylinder slidably mounted on the rod and the piston, means for supplying fluid under pressure to the interior of the cylinder alternately at opposite ends of the piston, and a cutter, movable in response to the movement of the cylinder for severing the sheet.

4. Apparatus for making inner tubes comprising means for providing a sheet of rubber, a pair of conveyors for advancing a sheet, means between the conveyors for severing the sheet, and a compressed air conduit beneath the ends of the conveyors, having openings for discharging a blast of air against one of the severed ends of the sheet.

5. Apparatus for making inner tubes comprising means for providing a sheet of rubber, a conveyor for advancing the end of a sheet, a cutter reciprocable transversely of the conveyor for severing the sheet, means movable transversely of the conveyor for driving the cutter, gearing connecting the cutter and the means for driving the cutter through the gearing at proportionately greater speed and distance than the speed of and distance traversed by said means.

6. Apparatus for making inner tubes comprising means for producing sheet rubber, a series of conveyors for handling the sheet rubber after it leaves the producing means, means for driving a plurality of the conveyors in the same direction, means for driving one of the plurality and a different conveyor of the series independently of the plurality and alternately therewith, and means for cutting the sheet rubber into the desired shape.

7. Apparatus for making inner tubes comprising means for producing sheet rubber, a series of conveyors for handling the sheet rubber after it leaves the producing means and operable in the same direction, means for driving an adjacent pair of the conveyors a predetermined distance and means for driving one of the pair and a different adjacent conveyor of the series a distance substantially greater than the first distance.

8. Apparatus for making inner tubes comprising a series of endless belt conveyors including rollers supporting opposite ends thereof, a one way clutch operatively associated with a roller of one of the conveyors, means for intermittently driving the clutch, a positive driving connection between the clutch and a roller of an adjacent conveyor, and means for supplying sheet rubber to the conveyors.

9. Apparatus for making inner tubes comprising a series of endless conveyors including rollers supporting opposite ends thereof, a one way clutch operatively associated with a roller of one of the conveyors, a shaft, a driving connection between the clutch and the shaft, a one way clutch operatively associated with the shaft, an oscillating gear segment operatively associated with the last mentioned clutch for intermittently driving the shaft, the first mentioned clutch, the rollers and the conveyor, and means for supplying sheet rubber to the conveyors.

In witness whereof, I have hereunto signed my name.

Signed at Akron, in the county of Summit and State of Ohio, U. S. A., this 13th day of January, 1928.

WALLACE H. CAMPBELL.